United States Patent
Servi et al.

(10) Patent No.: US 7,272,382 B2
(45) Date of Patent: Sep. 18, 2007

(54) COMMUNICATION DEVICE OPERATION MANAGEMENT

(75) Inventors: Daniel S. Servi, Lincolnshire, IL (US); Mark A. Tarlton, Barrington, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 10/835,868

(22) Filed: Apr. 29, 2004

(65) Prior Publication Data

US 2005/0245236 A1 Nov. 3, 2005

(51) Int. Cl.
- H04M 1/66 (2006.01)
- H04M 3/42 (2006.01)
- H04Q 7/22 (2006.01)
- H04Q 7/38 (2006.01)

(52) U.S. Cl. .................... 455/411; 455/414.1
(58) Field of Classification Search .............. 455/420, 455/88, 2.01, 459, 70, 68, 414.1, 456.4, 411; 379/8, 48; 726/30; 340/539.15, 539.32
See application file for complete search history.

(56) References Cited

U.S. PATENT DOCUMENTS

| | | | |
|---|---|---|---|
| 5,003,575 A * | 3/1991 | Chamberlin et al. | 379/88.26 |
| 5,325,310 A * | 6/1994 | Johnson et al. | 709/206 |
| 5,835,722 A * | 11/1998 | Bradshaw et al. | 709/225 |
| 5,999,613 A * | 12/1999 | Nabkel et al. | 379/215.01 |
| 6,011,973 A * | 1/2000 | Valentine et al. | 455/456.6 |
| 6,044,274 A * | 3/2000 | Vo et al. | 455/461 |
| 6,119,014 A * | 9/2000 | Alperovich et al. | 455/466 |
| 6,175,743 B1 * | 1/2001 | Alperovich et al. | 455/466 |
| 6,246,756 B1 | 6/2001 | Borland et al. | |
| 6,295,447 B1 * | 9/2001 | Reichelt et al. | 455/417 |
| 6,310,946 B1 * | 10/2001 | Bauer et al. | 379/208.01 |
| 6,426,705 B1 | 7/2002 | Wischoeffer | |
| 6,564,047 B1 * | 5/2003 | Steele et al. | 455/405 |
| 6,650,894 B1 * | 11/2003 | Berstis et al. | 455/405 |
| 6,731,942 B1 * | 5/2004 | Nageli | 455/458 |
| 2002/0049806 A1 | 4/2002 | Gatz et al. | |
| 2002/0103862 A1 | 8/2002 | Burr | |
| 2003/0014750 A1 | 1/2003 | Kamen | |
| 2003/0087627 A1 * | 5/2003 | Cannon | 455/404 |
| 2003/0156698 A1 * | 8/2003 | Creamer et al. | 379/207.01 |
| 2004/0166878 A1 * | 8/2004 | Erskine et al. | 455/456.1 |
| 2004/0180648 A1 * | 9/2004 | Hymel et al. | 455/418 |
| 2004/0198335 A1 * | 10/2004 | Campen | 455/419 |
| 2004/0203601 A1 * | 10/2004 | Morriss et al. | 455/411 |
| 2005/0096009 A1 * | 5/2005 | Ackley | 455/405 |
| 2005/0130633 A1 * | 6/2005 | Hill et al. | 455/414.1 |

* cited by examiner

Primary Examiner—William Trost
Assistant Examiner—Marivelisse Santiago-Cordero
(74) Attorney, Agent, or Firm—Sylvia Chen; Daniel C. Crilly

(57) ABSTRACT

A communication group is activated within a communication system (100) including an administrator device (125) and at least one subordinate device (130,135). Each subordinate device (130,135) is programmed with a set of operation rules dependent upon communication source (300), information content (305), current time (310), or geographic location (315). The administrator device (125) dynamically changes the stored set of operation rules for the subordinate device (130,135) by communicating a change message.

11 Claims, 7 Drawing Sheets

100

270 — RULES MEMORY

300 — SENDER IDENTIFICATION RULES

| IDENTIFICATION (320) | PRIORITY (325) | OPERATION MODES (330) |
|---|---|---|
| ID1 | ADMIN | OVERRIDE |
|  |  | SET MODES |
| ID2 | A | NO LOCATION TRANSMISSION |
| ⋮ | ⋮ | ⋮ |
| IDN | B | CALL DURATION RESTRICTED |

305 — MESSAGE CONTENT RULES

| CONTENT (335) | OPERATION MODES (340) |
|---|---|
| C1 | NO COMMUNICATION |
| C2 | PRIORITY OVERRIDE |
| ⋮ | ⋮ |
| CN | NO ACCESS |

310 — TIME BASED RULES

| TIME (345) | OPERATION MODES (350) |
|---|---|
| T1 | NO COMMUNICATION |
| T2 | COMMUNICATE GROUP A |
| ⋮ | ⋮ |
| TN | COMMUNICATE ADMIN ONLY |

315 — LOCATION BASED RULES

| LOCATION (355) | OPERATION MODES (360) |
|---|---|
| L1 | NO COMMUNICATION |
| L2 | NO LOCATION TRANSMISSION |
| ⋮ | ⋮ |
| LN | COMMUNICATE GROUP B |

*FIG. 3*

COMMUNICATION DEVICE OPERATION MANAGEMENT

BACKGROUND OF THE INVENTION

1. Field of the Invention

The present invention is generally related to communication devices and more particularly to systems and devices for remote provisioning of communication devices.

2. Description of the Related Art

Wireless communication is one technology that is helping to define today's culture, offering peace of mind to parents and their children. As they live in a world with home and hand-held computers, calculators, pagers and cordless telephones, today's youth are comfortable with wireless technology. Today's youth are taking advantage of the convenience, safety and security offered by wireless communication devices such as cellular telephones and messaging devices. At the same time, parents like the security and improved safety that wireless communication offers. According to a recent survey, eleven (11) percent of children aged five to nine now own a wireless communication device. Ownership among older children is even higher at an estimated thirty (30) percent. Young users are rapidly becoming the area of greatest growth in terms of new wireless customers. Concerns about child abductions have led many parents to give even their very young children wireless communication devices for emergency use.

Further, the capabilities and utility of wireless communication devices is continuing to rapidly increase. Text messaging (including instant messaging), internet access (including software and information downloading), streaming music video and hi-tech games are becoming more accessible on a variety of wireless devices. Youthful consumers can use their wireless communication devices as portable radios, mobile arcades and fashion accessories. Coupled together, the increased use and increased capabilities have caused a major cost containment issue for parents, who ultimately pay the monthly bill for the wireless utilization.

Families are not the only consumers suffering from the increased costs. A recent study found that some business executives regularly run up enormous monthly cellular telephone bills: In addition to the utilization mentioned above, executives run up large usage bills due to conference calling, international calling and, especially, international roaming.

Thus, the need to control wireless communication device usage by administrators, such as parents' control of children's usage and employer's control of employee's usage, has become an economic necessity for many.

One current method to control monthly wireless costs is by using prepaid plans. Drawbacks to prepaid plans include higher startup costs and higher usage charges. Prepaid plans, and the devices that come with them, also may provide less in the way of features and capabilities. Further, with most such plans, as with traditional plans, the pre-paid minutes expire periodically.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages all in accordance with the present invention.

FIG. 3 illustrates a memory for use within the communication device of FIG. 2.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, source code, object code, a shared library/dynamic load library and/or other sequence of instructions designed for execution on a computer system.

Figure 1:
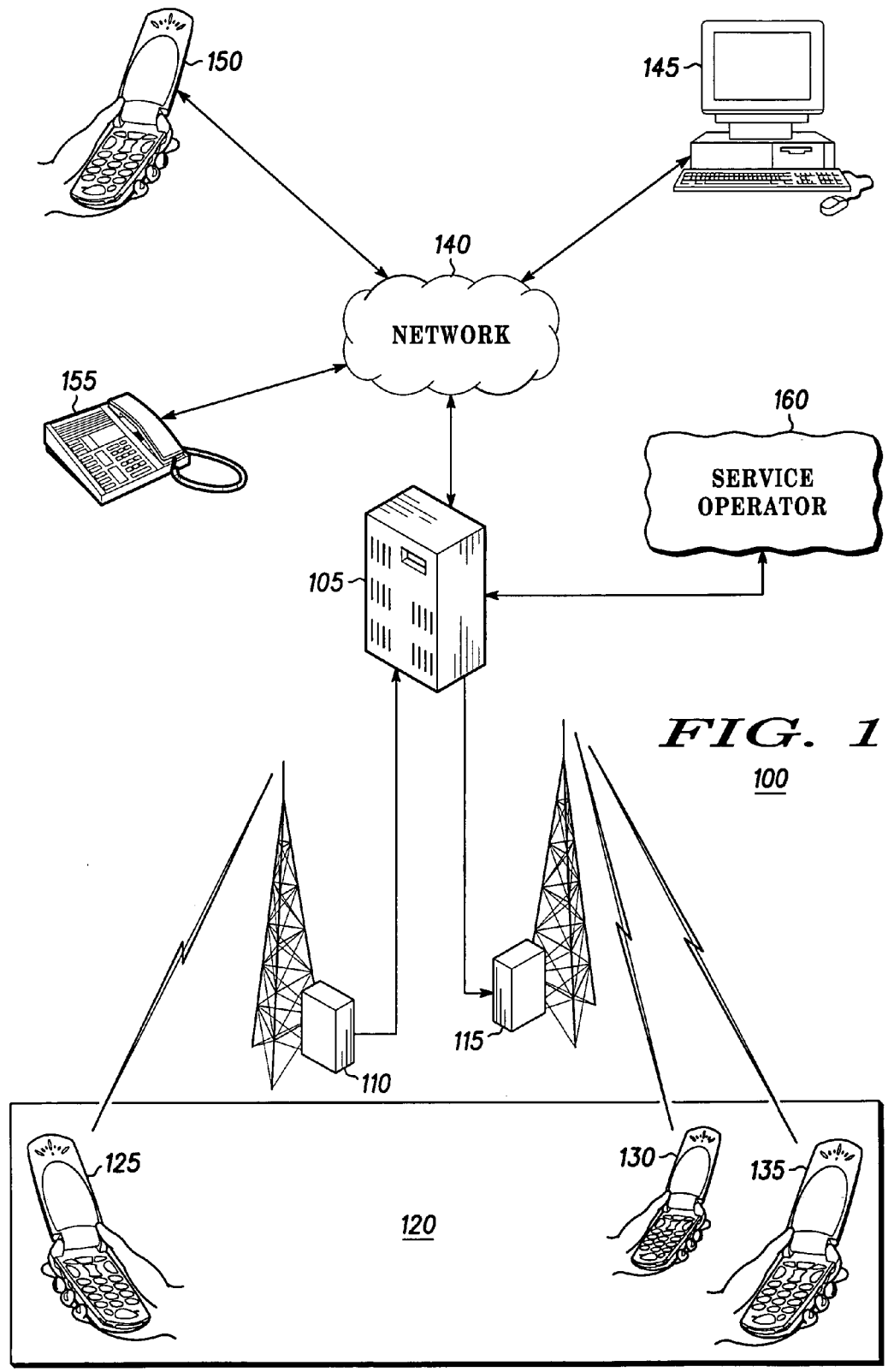
FIG. 1 is an electronic block diagram illustrating a communication system.

Referring to FIG. 1, an electronic block diagram illustrating a communication system 100 is shown. The communication system 100 can include a message input device for initiating messages into the communication system 100. It will be appreciated by those of ordinary skill in the art that the message input device can alternatively be external to the communication system 100. The message input device can be, for example, a telephone 155, a computer 145, or a wireless telephone 150, connected through a network 140 through a plurality of terminal links to a system controller 105. The terminal links, for example, can be a plurality of twisted wire pairs, a fiber optic cable, or a multiplexed trunk line.

The system controller 105 is coupled to and oversees the operation of at least one radio frequency (RF) transmitter 115 and at least one radio frequency (RF) receiver 110 through one or more communication links. The communication links typically are twisted pair telephone wires, and additionally can include radio frequency (RF), microwave, or other communication links. The radio frequency transmitter 115 and the radio frequency receiver 110 typically are used with message store and forward stations that encode and decode inbound and outbound messages into formats that are compatible with landline message switched computers and personal radio addressing requirements, such as cellular messages, short messaging service, or other messaging protocols. The system controller 105 can also function to encode and decode messages that are transmitted to or received by the radio frequency transmitter 115 or the radio frequency receiver 110. Telephony signals are typically transmitted to and received from the system controller 105 by telephone sets such as the telephone 155 or the wireless telephone 150. The system controller 105 encodes and schedules outbound messages. The system controller 105 then transmits the encoded outbound messages through the radio frequency transmitter 115 via a transmit antenna (not shown) to a plurality of communication devices 120 on at least one outbound radio frequency (RF) channel. The transmitted messages can be, for example, a data message or a voice call. Similarly, the system controller 105 receives and decodes inbound messages received by the radio frequency receiver 110 via a receive antenna (not shown) on at least one inbound radio frequency (RF) channel from one of the plurality of wireless communication devices 120. The received message can be, for example, a data message, a reply to a data message, a voice call, or a reply to a voice call.

It will be appreciated by one of ordinary skill in the art that the communication system 100, in accordance with the present invention, can function utilizing any wireless RF channel, for example, a two-way messaging channel, a mobile cellular telephone channel, or a mobile radio channel. Similarly, it will be appreciated by one of ordinary skill in the art that the communication system 100 can function utilizing other types of wireless communication channels such as infrared channels and/or Bluetooth channels.

It will be appreciated by one of ordinary skill in the art that the communication system 100 of FIG. 1 can alternatively function utilizing a wireline communication channel, such as a local area network (LAN), a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. The WAN, for example, can use a physical network, media such as X.25, Frame Relay, ISDN, Modem dial-up or other media, to connect devices or other local area networks. In the following description, the term "communication system" refers to any one or combination of the wireless communication systems or wireline communication systems mentioned above or an equivalent.

Similarly, it will be appreciated by one of ordinary skill in the art that each of the plurality of communication devices 120 of FIG. 1 can function as a wireless device including, for example, a mobile cellular telephone, a mobile radio data terminal, a mobile cellular telephone having an attached data terminal, a personal computer having a communication means either built in or attached, or a two way messaging device. Alternatively, each of the plurality of communication devices 120 can operate on a wired network that uses a physical network such as ARCNET, Ethernet, Token-ring, Local Talk or other network media to connect the communication devices, which represent wired network nodes into the network. In the following description, the term "communication device" refers to any of the devices mentioned above or an equivalent.

Referring back to FIG. 1, in accordance with the present invention, the plurality of communication devices 120 includes at least one administrator device 125 and at least one subordinate device 130, 135. The administrator device 125, for example, can be utilized by a parent or an employer. The administrator device 125, in accordance with the present invention, is utilized by the person responsible for the service fees in a family, business, or other group plan. The subordinate devices 130, 135, for example, can be utilized by a child or an employee. Preferably, a service operator 160 offers various features and functions to be programmed into each of the plurality of communication devices 120 upon activation of one or more of the devices. For example, access groups including associated administrator devices and subordinate devices can be established through the service provider at the time of purchase along with individual phone numbers for each device within the group account.

Each of the plurality of communication devices 120 has an address or identity assigned thereto which is a unique address within the communication system 100. Each address enables the transmission of a message only to the communication device having the address, and identifies the messages and responses received from the communication device with the address.

Figure 2:
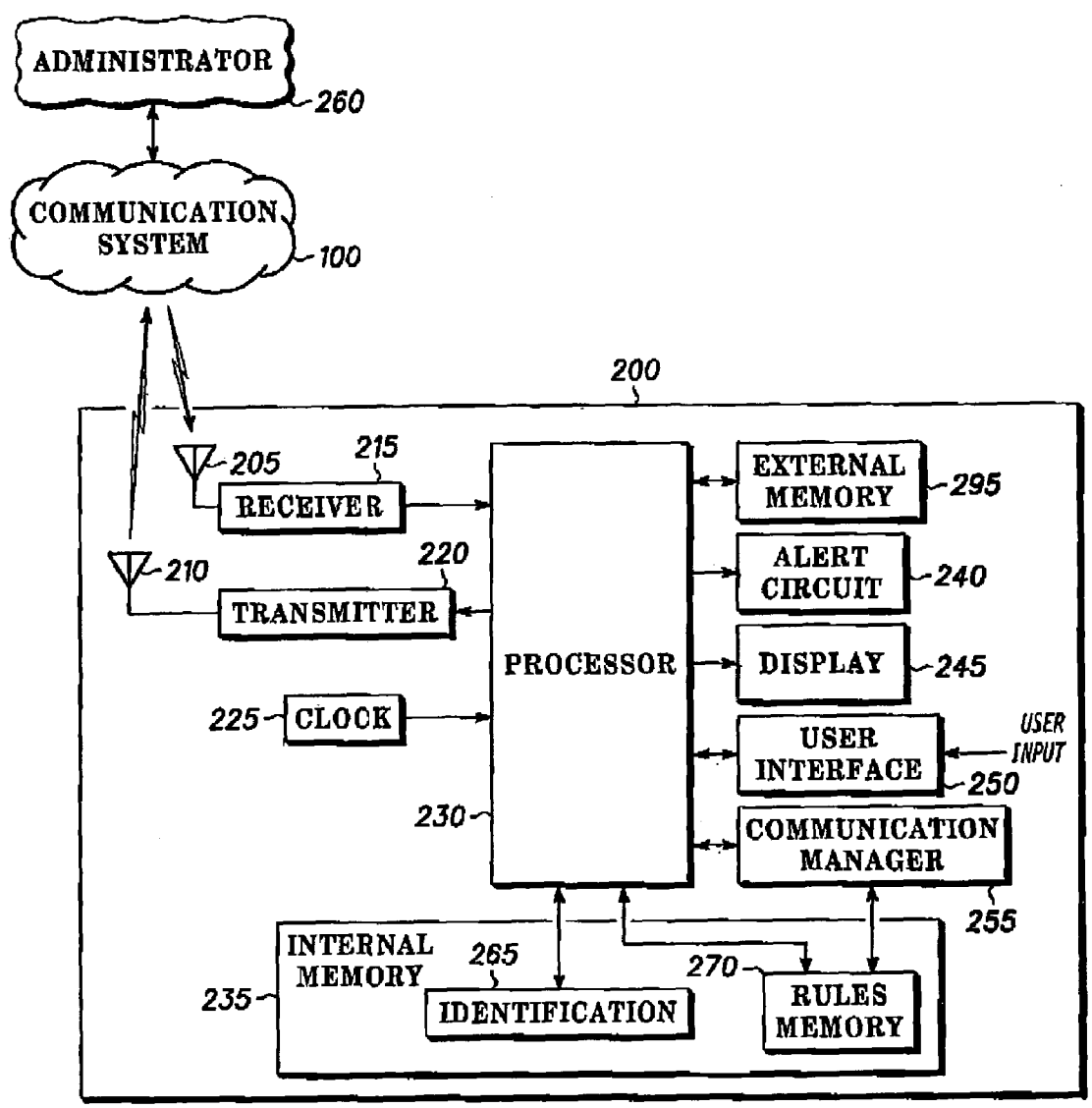
FIG. 2 is an electronic block diagram illustrating a communication device for use within the wireless communication system of FIG. 1.

FIG. 2 is an electronic block diagram illustrating a communication device 200 for use within the communication system 100 of FIG. 1. The communication device 200 can be, for example, the subordinate devices 130, 135 or the administrator device 125 of FIG. 1. As illustrated in FIG. 2, the communication device 200 includes a first antenna 205, a second antenna 210, a receiver 215, a transmitter 220, a clock 225, a processor 230, an internal memory 235, an external memory 295, an alert circuit 240, a display 245, a user interface 250 and a communication manager 255.

The first antenna 205 intercepts transmitted signals from the communication system 100. The first antenna 205 is coupled to the receiver 215, which employs conventional demodulation techniques for receiving the communication signals transmitted by the communication system 100. Coupled to the receiver 215 is the processor 230 utilizing conventional signal-processing techniques for processing received messages. The processor 230 decodes an address or identification in the demodulated data of the received message, compares the decoded address or identification with one or more identifications 265 stored in the internal memory 235, and, when a match is detected, proceeds to process the remaining portion of the received message.

To perform the necessary functions of the communication device 100, the processor 230 is coupled to the internal memory 235, which preferably includes a random access memory (RAM), a read-only memory (ROM), and an electrically erasable programmable read-only memory (EEPROM)(not shown). It will be appreciated by those of ordinary skill in the art that the internal memory 235 can be integrated within the communication device 200, or alternatively can be at least partially contained within an external memory such as the external memory 295. The external memory 295, for example, can be a subscriber identification module (SIM) card mechanically interconnected to the communication device. A SIM card is an electronic device typically including a microprocessor unit and a memory encapsulated within a small flexible plastic card. The SIM card additionally includes some form of interface for communicating with an external device or system. The SIM card can be used to transfer a variety of information from/to the communication device 200 and/or any other compatible device. In accordance with the present invention, a rules memory 270 is stored within the internal memory 235 or alternatively within the external memory 295.

Upon receipt and processing of a message or a call, the processor 230 preferably generates a command signal to the alert circuit 240 as a notification that the message has been received and stored or alternatively that a call is waiting for a response. The alert circuit 240 can include a speaker (not shown) with associated speaker drive circuitry capable of playing melodies and other audible alerts, a vibrator (not shown) with associated vibrator drive circuitry capable of producing a physical vibration, or one or more light emitting diodes (LEDs) (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 240.

Upon receipt and processing of a message or a received call, the processor 230 preferably also generates a command signal to the display 245 to generate a visual notification of the receipt and storage of the message. When the display 245 receives the command signal from the processor 230 that the message has been received and stored in memory, or alternatively that a call is awaiting a response, an indication is displayed. The indication, for example can be the activation of one of a plurality of icons on the display 245 or alternatively the activation of a notification message. The notification message, for example, can include the name, telephone number, or other identification of the calling party. The display 245 can be, for example, a liquid crystal display utilized to display text and graphics. It will be appreciated by one of ordinary skill in the art that other similar displays such as cathode ray tube displays, organic light emitting diodes, LEDs, or plasma displays can be utilized for the display 245.

The communication device preferably further includes the clock 225. The clock 225 provides timing for the processor 230. The clock 225 can include the current time for use in the operation of the communication device 200. The clock 225 also provides a source for timing of feature enhancements such as active and inactive periods of operation or periods of alerting. The clock 225 further can provide a source of timing for time-based rules used by the communications manager 255.

In a preferred embodiment, the communication device 200 includes the communications manager 255. The communications manager 255 can be hard coded or programmed into the communication device 200 during manufacturing, can be programmed over-the-air upon customer subscription, or can be a downloadable application. It will be appreciated that other programming methods can be utilized for programming the communications manager 255 into the communication device 200. It will be further appreciated by one of ordinary skill in the art that the communications manager 255 can be hardware circuitry within the communication device 200 including being integrated within the processor 230.

The communications manager 255 operates using a plurality of rules which can be manually set by the user of the communication device 200, can be preprogrammed into the communication device 200, or can be programmed into the communication device 200 by an administrator 260 via the communication system 100. Preferably, the plurality of rules can be changed as desired by the administrator 260.

Preferably, the user interface 250 is coupled to the processor 230. The user interface 250 can be one or more buttons used to generate a button press or a series of button presses, a voice response from the device user, or some other similar method of manual response initiated by the device user of the communication device 200.

The transmitter 220 is coupled to the processor 230 and is responsive to commands from the processor 230. When the transmitter 220 receives a command from the processor 230, the transmitter 220 sends a signal via the second antenna 210 to the communication system 100.

In an alternative embodiment (not shown), the communication device 200 includes one antenna performing the functionality of the first antenna 205 and the second antenna 210. Further, the communication device 200 alternatively includes a transceiver circuit (not shown) performing the functionality of the receiver 215 and the transmitter 220. It will be appreciated by one of ordinary skill in the art that other similar electronic block diagrams of the same or alternate type can be utilized for the communication device 200.

FIG. 3 illustrates the rules memory 270 for use within the communication device 200 of FIG. 2 in accordance with the present invention. As described previously herein, the rules memory 270 can be stored within the internal memory 235, the external memory 295, or a combination thereof. The rules memory 270 preferably stores a plurality of predetermined rules such as a plurality of sender identification rules 300, a plurality of message content rules 305, a plurality of time-based rules 310, and a plurality of location-based rules 315. It will be appreciated by those of ordinary skill in the art that other equivalent categories of rules can be stored within the rules memory 270 in accordance with the present invention.

The plurality of sender identification rules 300 preferably includes a plurality of identifications 320 stored with associated priority ratings 325 and with associated operation modes 330. For example, when the identification stored is an administrator priority, the associated operation modes can include tagging the identification as a "privileged" caller with predetermined rights. The associated operation mode for an identification with administrator priority, for example, can include allowing the identified caller to change phone behaviors such as to reconfigure the rules stored in the rules memory 270. Capability for an administrator can include control of the service levels of the user (e.g., minutes of use, enable/disable long distance calls, content downloads, control times of phone on/off), etc. An identification with administrator priority further may allow call interrupt (i.e., automatically invoke call waiting on normal call so that parent has priority). Similarly, an associated operation mode for one or more stored identifications can allow remote interrogation of the communication device for status and location or alternatively restrict such remote interrogation.

The plurality of message content rules 305 preferably includes a plurality of content 335 stored with associated content-based operation modes 340. For example, one entry of the stored content may trigger blocking of all communication to/from the communication device. Alternatively, another entry of the stored content can trigger a priority override of the associated message. Alternatively, a further entry of the stored content can be blocked from access, such as blocking internet access for URLs with the stored content. This set of rules is especially applicable for employer and parental controls of Internet access and content downloading in terms of type and quantity.

The plurality of time-based rules 310 preferably includes a plurality of time periods 345 stored with associated time-based operation modes 350. For example, communication to/from the communication device can be blocked during one time period. Alternatively, communication with only a particular group of devices can be allowed during another time period. Alternatively, communication with only the administrator can be allowed during yet another time period. The time-based operation modes provide the ability for the administrator to set rules for device usage, such as time of day (for example, most schools do not allow phone usage during school hours). It also provides for automatically turning on the phone at certain times (i.e., after school) or for priority calls from home, but possibly in vibrate mode during certain hours. Alternatively, communications transmitted to a device during a particular time period can be automatically forwarded to a designated alternate device.

The plurality of location-based rules 315 preferably includes a plurality of locations 355 stored with associated location-based operation modes 360. The plurality of location-based rules 315, for example, can change operation modes dependent upon one or more geographic locations. For example, in one location, transmission of location data can be restricted. In another location, communication to/from the communication device can be blocked. In one location, communication to/from the communication device can be limited to a certain group of devices.

In accordance with the present invention, when a communication is received, the communication is evaluated for any of the plurality of rules stored in the rules memory 270. It will be appreciated by those of ordinary skill in the art that more than one set of rules can be applied to an individual communication in accordance with the present invention. For example, operation modes associated with the identification, the location, and the time may all be implemented for the received communication. Further, one or more rules (not shown) can be stored and implemented for a combination of sender identification, location, message content, and/or time, and the like. For example, a rule may be implemented when the Location=L1 AND the Time=T2 AND the sender identification=ID3.

Figure 4:
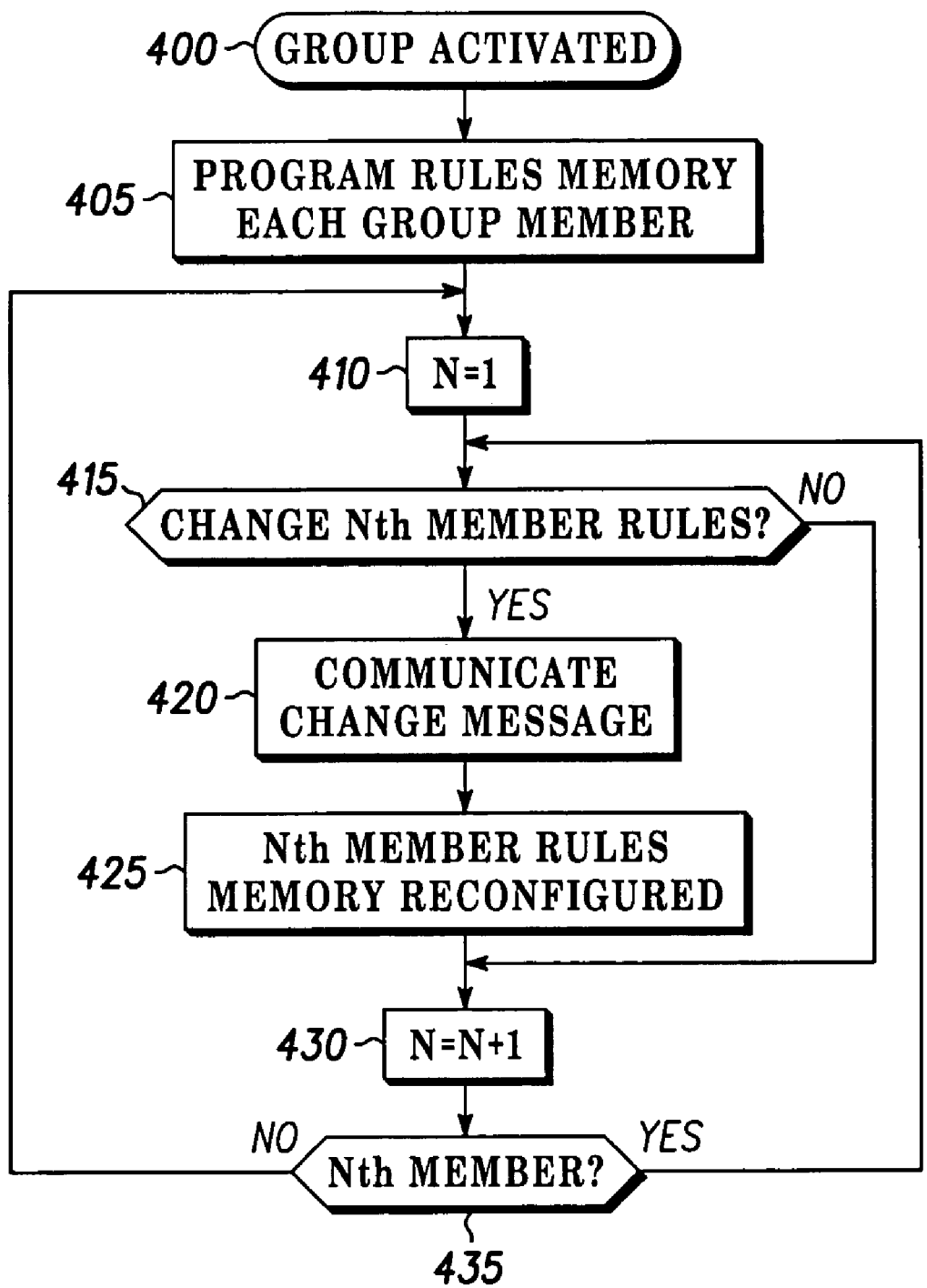
FIG. 4 is a flowchart illustrating one embodiment of the operation of the communication system of FIG. 1.

FIG. 4 is a flowchart illustrating one embodiment of the operation of the communication system 100. Specifically, FIG. 4 illustrates one embodiment for programming the rules memory 270 of the communication device 200 within the communication system 100 in accordance with the present invention. As illustrated, the operation begins with Step 400 in which a communication group is activated within the communication system 100. For example, the administrator 260 can purchase a group wireless communication service plan from the service operator 160. The service operator 160 then activates telephone numbers for the administrator device 125 and one or more subordinate devices 130,135. The group service plan can be a family plan, a business plan, or any other group plan. Next, in Step 405, each device within the group service plan is provisioned. Specifically, the rules memory 270 for each communication device is programmed as discussed previously herein. It will be appreciated by those of ordinary skill in the art that the rules memory 270 can be programmed at the point of sale by the service operator, via the Internet by the purchaser directly, over the air via a request to the service operator, or via any other equivalent method for programming the rules memory 270 of each device. Key parameters for each device preferably can be sent out via over the air device management techniques which are well known in the art.

Next, in Step 410, an index is set to one (1). Next, in Step 415, the operation determines whether or not the Nth member rules require reconfiguration. For example, the administrator 260 may desire/require to re-provision one or more subordinate devices 130, 135 as needed based on changing needs. Alternatively, the user of a subordinate device 130, 135 may desire/require to re-provision their own or another's device. Alternatively, the system provider may desire/require to re-provision one or more devices when an account is updated or changed. When a change for the Nth member's rules is detected in Step 415, the operation continues to Step 420 in which a change message is communicated to the Nth member's communication device. For example, a message can be communicated from the administrator device 125 to one of the subordinate devices 130 within a service plan group. The communicated message can be a tagged message. The message, in one embodiment, can include a "TAG" which identifies the message source as the administrator (i.e., parent, employer, or other preferred caller). This tag can, for example, be based upon caller identification with authentication. The Nth member's device can securely authenticate the sender as a preferred party with predetermined rights. In combination or alternatively, within the Nth member's communication device, an in-phone call filter (based on the TAG) can recognize the incoming call as an administrator call or message. Mechanisms (e.g., rules, tables, functions) within the Nth member's communication device provide a consumer the ability to configure the dispatching functions in the rules memory 270 as described previously herein which dictate the device's behaviors and responses to control messages. Next, in Step 425, the Nth member's rules memory 270 is reconfigured.

Next, and when no change is required to the Nth member rules in Step 415, the operation continues to Step 430 in which the index N is incremented. Next, in Step 435, the operation determines if an Nth member exists. When no Nth member exists within the service plan group, the operation cycles back to Step 410 with the index reset to one (1). When an Nth member does exist within the service plan group, the operation cycles back to Step 415 in which the operation determines whether a change is required/desired to the Nth member's rules memory 270.

The operation as described and illustrated in FIG. 4 maximizes the safety benefits of providing group members with wireless devices while minimizing the cost risks to the party responsible for the service fees. It further provides the flexibility to change rules for operation of a subordinate device along with changing factors and needs.

Figure 5:
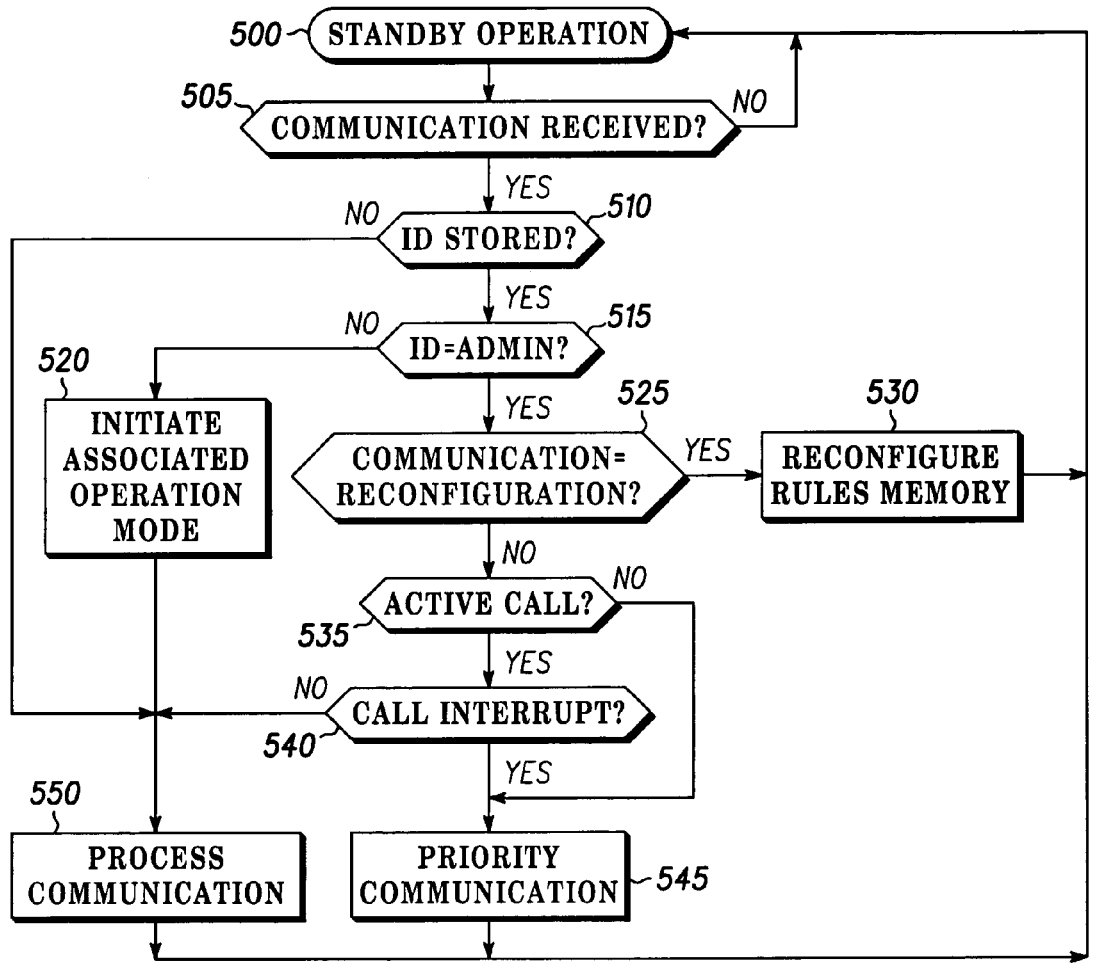
FIGS. 5 through 7 are flowcharts illustrating various embodiments of the operation of the communication device of FIG. 2.

FIG. 5 is a flowchart illustrating one embodiment of the operation of the communication device 200 within the communication system 100. Specifically, FIG. 5 illustrates one example of the varying operation of the communication device 200 as dependent upon the source of a received communication. The communications manager 255 of the communication device 200, for example, can be programmed with the operation of FIG. 5. The operation of FIG. 5 begins with Step 500 in which the communication device 200 is in standby mode. Standby mode allows the communication device 200 to operate in a low power mode for battery savings operation. Next, in Step 505, the operation determines whether or not a communication has been received. The communication, for example, can be a text message, a voice call, a video call, or the like. When no communication has been received, the operation cycles back to standby operation of Step 500. When a communication has been received, the operation proceeds to Step 510 in which the operation compares the identification of the caller/sender of the call/message with the plurality of identifications 320 stored in the rules memory 270. When the identification contained within the call/message is one of the plurality of identifications 320 stored in the rules memory 270, the operation continues to Step 515 in which the operation determines whether the identification is an administrator identification. When the sender's identification is not an administrator identification in Step 515, the operation proceeds to Step 520 in which the operation mode associated with the stored identification is initiated.

When the identification associated with the received communication is an administrator identification in Step 515, the operation proceeds to Step 525 in which the operation determines whether the message includes a rules memory reconfiguration message. When the message does include a rules memory reconfiguration message, the operation continues to Step 530 in which the rules memory is reconfigured as described previously herein in FIG. 4. When the received communication does not include a rules memory reconfiguration message, the operation continues to Step 535 in which it is determined whether or not the communication device 200 is currently in an active call. When the communication device 200 is in an active call, the operation continues to Step 540 in which it determines whether the received communication authorizes/requires a call interrupt. For example, when the administrator is a parent of the subordinate, a parental call interrupt can automatically invoke call waiting on the active normal call so that parent has priority. For instance, a child may use a telephone for long-duration social calls, but parents may need to interrupt to deliver a priority message or make sure that the child takes their message before doing anything else. Allowing the administrator to interrupt an active call provides for the parent (or business employer) calls to have first priority and requires the child or employee to take or respond to specific messages before normal usage is resumed. When call interrupt is not activated within the received communication in Step 540, when the identification is not stored in the rules memory 270 in Step 510, and/or when the associated operation mode has been initiated in Step 520, the operation continues to Step 550 in which the received communication is processed. Next, or after the rules memory 270 is reconfigured in Step 530, the operation cycles back to the standby operation of Step 500.

When a call interrupt is required by the received communication in Step 540, or when no active call is in progress in Step 535, the operation continues with Step 545 in which a priority communication is processed. The operation then cycles back to the standby mode of Step 500. The operation as described in FIG. 5 provides for dynamic device operation based on the identification of a message sender/caller of a received communication.

Figure 6:
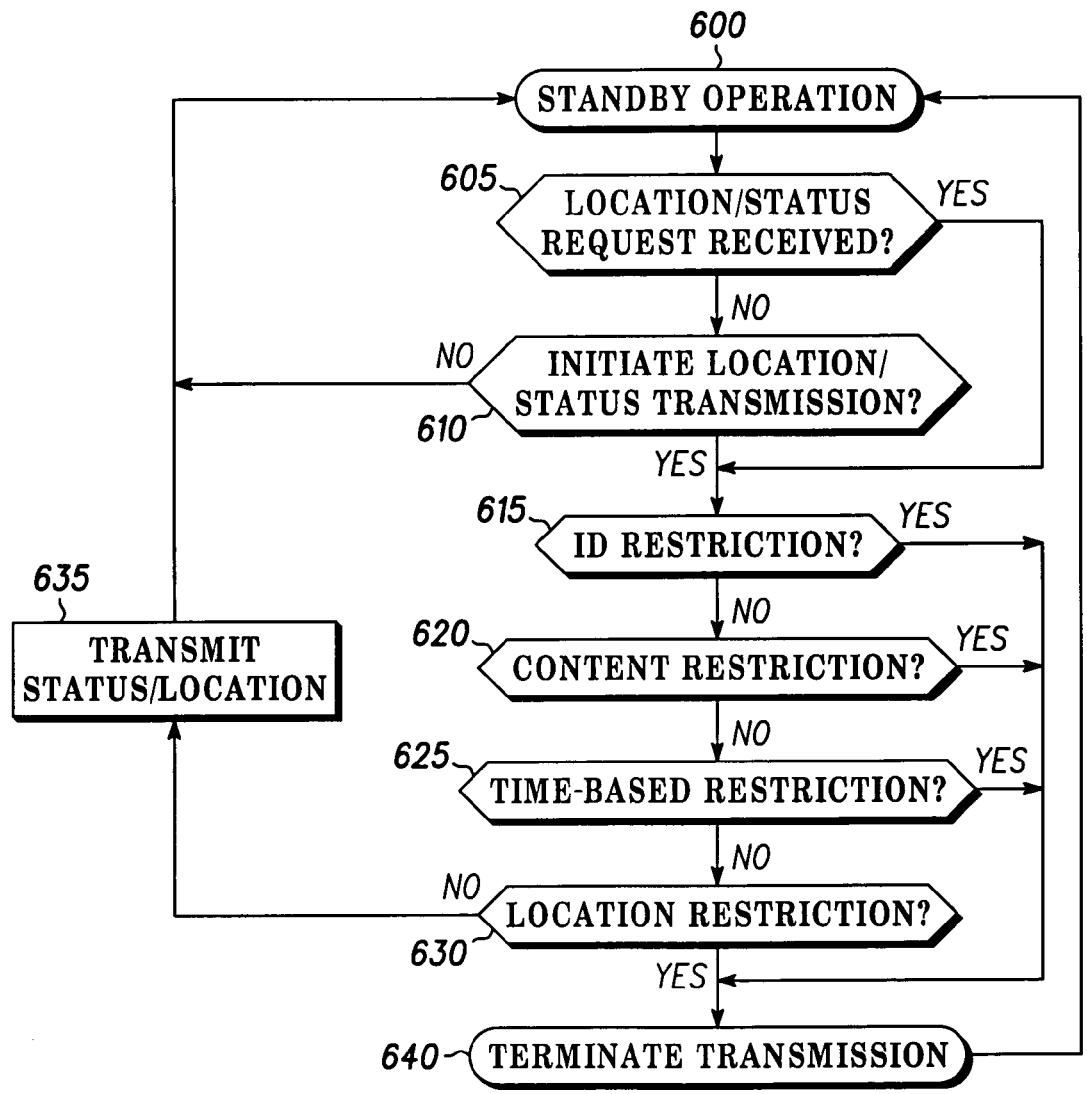

FIG. 6 is a flowchart illustrating one embodiment of the operation of the communication device 200 within the communication system 100. Specifically, FIG. 6 illustrates access/control of location information. The communications manager 255 of the communication device 200, for example, can be programmed with the operation of FIG. 6. The operation of FIG. 6 begins with Step 600 in which the communication device 200 is in standby operation. Next in Step 605, the operation determines whether or not a location and/or status request has been received by the communication device 200. When no location or status request has been received in Step 605, the operation continues to Step 610 in which the operation determines whether or not the communication device 200 is initiating transmission of a location and/or status transmission. For example, a user input to the user interface 250 can cause the transmission of location and/or status information. Alternatively, the communication device 200 can be programmed to transmit location and/or status information upon detection of an event, time, geographic location and the like. When no location and/or status transmission has been initiated in Step 610, the operation cycles back to the standby mode of Step 600.

When a location and/or status request has been received in Step 605 and/or a location and/or status transmission has been initiated in Step 610, the operation continues to Step 615 in which the operation compares an identification of the request of Step 605 or the intended transmission recipient of Step 610 with the plurality of identifications 320 stored in the rules memory 270. When the identification is one of the stored plurality of identifications 320, the operation determines whether or not the transmission of location and/or status information is restricted from that particular identification. When no such restriction has been stored, the operation continues with Step 620, in which the content to be transmitted is compared to the plurality of content 335 stored within the rules memory 270. When the information to be transmitted is stored within the plurality of content 335, the operation determines whether a content-based restriction has been associated with the location and/or status information. When no content-based restriction has been stored, the operation continues to Step 625 in which the current time is compared to the plurality of time periods 345 stored within the rules memory 270. When the current time is within one of the plurality of time periods 345, the operation determines whether a time based restriction is associated with the current time for the location and/or status information. When no time-based restriction for the current time has been stored, the operation continues to Step 630 in which the current location of the communication device 200 is compared to the plurality of locations 355 stored in the rules memory 270. When the location is one of the stored plurality of locations 355, the operation determines whether a location-based restriction is associated with the current location for the transmission of the location and/or status information. When no location-based restriction is associated with the current location, the operation continues to Step 635 in which the location and/or status is transmitted. The operation then cycles back to standby operation of Step 600.

When an identification restriction is identified in Step 615, or a content-based restriction is identified in Step 620, or a time-based restriction is identified in Step 625, or a location-based restriction is identified in Step 630, the transmission of the location and/or status information is terminated in step 640. The operation then cycles back to the standby mode of Step 600.

The operation as described in FIG. 6 allows location and/or device status access restrictions while still allowing for location-based services and utilization of the "e-911" requirements. Control of location data that may be generated during a call is important to ensure such data isn't transmitted to unnecessary recipients.

Figure 7:
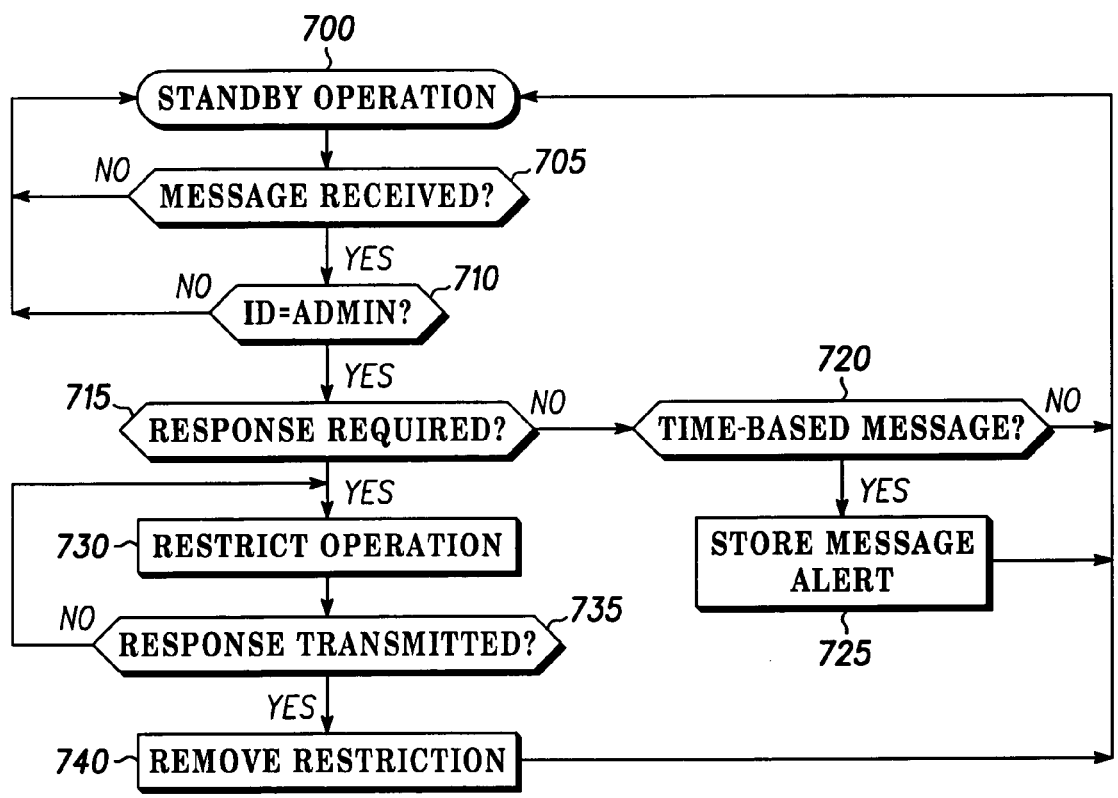

FIG. 7 is a flowchart illustrating one embodiment of the operation of the communication device 200 within the communication system 100. Specifically, FIG. 7 illustrates operation control of the communication device 200 by an administrator. The communications manager 255 of the communication device 200, for example, can be programmed with the operation of FIG. 7. The operation of FIG. 7 begins with Step 700 in which the communication device 200 is in standby mode. Next, in Step 705, the operation determines whether a communication has been received.

When no communication has been received, the operation cycles back to standby operation of Step 700. When a communication has been received in Step 705, the operation proceeds to Step 710 in which the identification of the communication sender is compared to one or more administrator identifications stored in the rules memory 270. When the identification is not an administrator identification, the operation cycles back to the standby mode of Step 700.

When the identification is an administrator identification in Step 710, the operation proceeds to Step 715 in which it is determined whether the communication requires a response. When the received communication does not require a response in Step 715, the operation proceeds to Step 720 in which it is determined whether the received communication is a time-based message. For example, the sender of the communication may desire the message to be delivered at a specific time. When the received communication is a time-based message, the operation proceeds to Step 725 in which a message reminder is stored in the memory 235 of the communication device 200. For example a reminder alert including the received communication can be added to a calendar application within the communication device 200. Next, or when the message is not a time-based message in Step 720, the operation cycles back to standby mode of Step 700.

When a response is required in Step 715, the operation proceeds to Step 730 in which operation of the communication device 200 is restricted. For example, all outgoing calls can be blocked until the subordinate device 130, 135 responds to the received communication. Alternatively, the communication restriction can be that the administrator 260 imposes limitations on the operating mode of the communication device 200 such that it enters a "passive-receive" state. In this "passive-receive" state, the device 200 can receive messages but cannot call out, only priority messages will be received a receipt acknowledgement will be sent automatically indicating that the message reached the device, and/or delivery notification can be specified by the authorized sender to either immediately alert or delay alert to a later time. Next, in Step 735, the operation periodically determines whether or not a response has been transmitted. When no response has been transmitted, the operation cycles back to the restricted operation of Step 730. When a response has been transmitted in Step 735, the restriction is removed in Step 740 and the operation mode previous to imposing the restriction resumes. The operation then cycles back to the standby operation of Step 700.

The present invention as described herein provides dynamic operation management of a communication device. The present invention provides a comprehensive means for a parent or other authority to provision a communication device or add special tags to voice or text messages to enhance or direct the communications with another device for which the authority is responsible. The present invention further provides a method for the use of special priority tags to dynamically control a receiving device's behavior and response to designated calls or messages from "preferred" senders. The present invention includes mechanisms that permit an authenticated individual to provision the subordinate communication device and control the service costs and further allows the authenticated individual to customize the device behaviors. The re-configuration can be accomplished from an administrator's device to one or more subordinate devices.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for managing the operation of a communication device, the method comprising:

storing, at the communication device, a plurality of identifications, a plurality of content, a plurality of time periods, a plurality of locations, and a plurality of operation modes, a first set of the operation modes corresponding to the plurality of identifications, a second Set of the operation modes corresponding to the plurality of content, a third set of the operation modes corresponding to the plurality of time periods, and a fourth set of the operation modes corresponding to the plurality of locations;

receiving, by the communication device at a first time, a request to transmit information, the request including an identification of an intended recipient of the information, the communication device being located at a first location, the information being one of a location of the communication device and a status of the communication device;

comparing, within the communication device, the identification to the plurality of identifications;

restricting, at the communication device, transmission of the information in accordance with an operation mode of the first set of operation modes corresponding to the identification in the event that the identification matches at least one of the plurality of identifications;

in the event that the identification does not match at least one of the plurality of identifications,
   comparing, within the communication device, content of the information to the plurality of content, and
   restricting transmission of the information in accordance with an operation mode of the second set of operation modes corresponding to the content of the information in the event that the content matches at least one of the plurality of content;

in the event that the identification does not match at least one of the plurality of identifications and the content of the information does not match at least one of the plurality of content,
   comparing, within the communication device, the first time to the plurality of time periods, and
   restricting transmission of the information in accordance with an operation mode of the third set of operation modes corresponding to a time period that includes the first time in the event that the first time falls within at least one of the plurality of time periods;

in the event that the identification does not match at least one of the plurality of identifications, the content of the information does not match at least one of the plurality of content, and the first time does not fall within one of the plurality of time periods, comparing, within the communication device, the first location to the plurality of locations, and restricting transmission of the information in accordance with an operation mode of the fourth set of operation modes corresponding to the first location in the event that the first location matches at least one of the plurality of locations; and transmitting, by the communication device, the information without restriction in the event that the identification does not match at least one of the plurality of identifications, the content of the information does not match at least one of the plurality of content, the first time does not fall within one of the plurality of time periods, and the first location does not match at least one of the plurality of locations.

2. A method for managing the operation of a communication device as recited in claim 1, wherein the receiving step comprises receiving a user input to initiate the request to transmit information.

3. A method for managing the operation of a communication device as recited in claim 1, wherein the receiving step comprises detecting an event requiring transmission of the information.

4. A method for managing the operation of a communication device as recited in claim 1, wherein at least one of the restricting transmission steps comprises:

blocking at least some outgoing calls initiated by a user of the communication device.

5. A method for managing the operation of a communication device as recited in claim 4, wherein the step of blocking at least some outgoing calls comprises:

blocking all outgoing calls initiated by the user of the communication device.

6. A method for managing the operation of a communication device as recited in claim 4, wherein at least one of the restricting transmission steps further comprises:

allowing reception of at least some incoming calls.

7. A method for managing the operation of a communication device as recited in claim 6, wherein the step of allowing reception of at least some incoming calls comprises:

allowing reception of only priority incoming calls.

8. A method for managing the operation of a communication device as recited in claim 4, wherein the step of blocking at least some outgoing calls further comprises:

permitting transmission of an acknowledgment indicating that the communication device has received an incoming call.

9. A method for managing the operation of a communication device as recited in claim 1, the method further comprising:

activating a communication group within a communication system, wherein the communication group comprises:

an administrator device, and at least the communication device;

programming at least the communication device with a set of operation rules, the set of operation rules including at Least the first set of operation modes, the second set of operation modes, the third set of operation modes and the fourth set of operation modes;

receiving a change message by the communication device, wherein the change message is communicated from the administrator device; and changing the set of operation rules within the communication device responsive to the change message.

10. A method for managing the operation of a communication device as recited in claim 9, wherein the change message includes a message source identification, the method further comprising:

securely authenticating, at the communication device, the administrator device using the message source identification prior to the changing step.

11. A method for managing the operation of a communication device as recited in claim 9, further comprising:

identifying the change message as originating from the administrator device prior to the changing step.

* * * * *